(12) United States Patent
Yu et al.

(10) Patent No.: US 10,909,752 B2
(45) Date of Patent: Feb. 2, 2021

(54) ALL-AROUND SPHERICAL LIGHT FIELD RENDERING METHOD

(71) Applicant: PLEX-VR DIGITAL TECHNOLOGY (SHANGHAI) CO., LTD., Shanghai (CN)

(72) Inventors: Jingyi Yu, Shanghai (CN); Huangjie Yu, Shanghai (CN)

(73) Assignee: PLEX-VR DIGITAL TECHNOLOGY (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/641,635

(22) PCT Filed: Jul. 16, 2018

(86) PCT No.: PCT/CN2018/095778
§ 371 (c)(1),
(2) Date: Feb. 24, 2020

(87) PCT Pub. No.: WO2019/042028
PCT Pub. Date: Mar. 7, 2019

(65) Prior Publication Data
US 2020/0380770 A1    Dec. 3, 2020

(30) Foreign Application Priority Data

Sep. 1, 2017    (CN) .......................... 2017 1 0783621

(51) Int. Cl.
*G06T 15/50*    (2011.01)
*G06T 7/557*    (2017.01)

(52) U.S. Cl.
CPC ............ *G06T 15/506* (2013.01); *G06T 7/557* (2017.01); *G06T 2207/10028* (2013.01); *G06T 2215/16* (2013.01)

(58) Field of Classification Search
None
See application file for complete search history.

(56) References Cited

U.S. PATENT DOCUMENTS

2012/0229463 A1    9/2012 Yeh

FOREIGN PATENT DOCUMENTS

| CN | 1604142 A | 4/2005 |
|----|-----------|--------|
| CN | 103345771 A | 10/2013 |

(Continued)

OTHER PUBLICATIONS

Todt et al., "Fast (Spherical) Light Field Rendering with Per-Pixel Depth", Computer Graphics Group, University of Siegen, 2007. (Year: 2007).*

(Continued)

*Primary Examiner* — Nicholas R Wilson
(74) *Attorney, Agent, or Firm* — Winston Hsu

(57) ABSTRACT

The present invention relates to an all-around spherical light field rendering method, comprising: a preparation step, i.e., preparing to input and load related files; pre-computing a latticed depth map of positions of reference cameras which are densely covered on a sphere; moving a rendering camera, enabling the moving range of the rendering camera to be the surface of the sphere, and calculating and identifying the reference cameras surrounding the rendering camera around the rendering camera; performing back projection on pixels of the rendering camera, and performing depth test with the four reference cameras; and interpolating the reference cameras passing through the depth test, thereby obtaining a finally rendered pixel value. By means of the present invention, the rendering results can be rapidly seen in real time; an object can be observed from any angle on the spherical surface, and a real immersion feeling can be felt.

6 Claims, 3 Drawing Sheets

(56) References Cited

FOREIGN PATENT DOCUMENTS

| | | |
|---|---|---|
| CN | 103500467 A | 1/2014 |
| CN | 103530907 A | 1/2014 |
| CN | 104715504 A | 6/2015 |
| CN | 106910242 A | 6/2017 |
| CN | 107085824 A | 8/2017 |

OTHER PUBLICATIONS

Office action dated Apr. 13, 2020 for KR application No. 10-2020-7005629, filing date: Feb. 26, 2020, pp. 1-5.
Office action dated Apr. 14, 2020 for GB application No. GB2002591.2, pp. 1-2.
S. Todt et al., "GPU-Based Spherical Light Field Rendering with Per-Fragment Depth Correction", Computer Graphics forum, Jul. 2008, pp. 2081-2095, vol. 27 (2008), No. 8, Blackwell Publishing, UK and USA.

* cited by examiner

ALL-AROUND SPHERICAL LIGHT FIELD RENDERING METHOD

BACKGROUND OF THE INVENTION

1. Field of the Invention

The invention relates to a computer graphics technical field, and more particularly, to an all-around spherical light field rendering method capable of real-time rendering real objects by using multi-viewpoint images.

2. Description of the Prior Art

Currently, a well-known 3D model rendering engine uses a combination of model and texture mapping, and is rendered into a map by using a rasterized rendering pipeline. Most of characters and scenes in a current game field are rendered by this method. However, with the development of virtual reality technology, such artificial rendering results have fallen short of expectations because of a lack of realism.

The current rendering engine mainly has the following two problems:
First, it takes a lot of human resources to produce rendering data, specifically a modeler needs to spend a lot of time on building a model similar to a real object, and debugging materials and textures of the model to make it look close to a real object. This process may require repeated calculation. Second, the rendering results are significantly different from real objects, since the 3D models and texture maps input by traditional rendering engines are handmade, many details of the objects cannot be retained. These details are the best expression of an authenticity of the objects, so there is always a big difference between a rendered image and an image seen by naked eyes.

The above problems generally exist in the existing 3D rendering engines, so the present invention proposes a rendering method, and obtains required data which can be taken by a camera to omit steps of debugging the texture mapping. The rendering results are more realistic and increase immersion. Similar to the traditional rendering method, the present invention also provides an "all-around" function, for viewing an object from any angle.

SUMMARY OF THE INVENTION

In order to overcome the deficiency of the prior art rendering engine which cannot render real objects, the present invention aims to provide an all-around spherical light field rendering method, to not only realize the real-time rendering, but also render images of real objects from various perspectives by using multi-viewpoint images.

In order to achieve above objectives, the technical solution adopted by the present invention includes the following steps:
step 1: a preparing step, for preparing input and load of related files;
step 2: pre-calculating a depth map of positions of reference cameras densely distributed on a sphere in a grid shape;
step 3: moving a rendering camera, a range of which is a surface of the sphere, and calculating and identifying four reference cameras surrounding the rendering camera;
step 4: back-projecting pixels of the rendering camera and performing a depth test with the four reference cameras;
step 5: interpolating the reference cameras passing the depth test, and obtaining a final rendered pixel value.

Wherein if there is no reference camera passing the depth test in step 4, further selecting other reference cameras located on an outer circle of the four reference cameras until there is a reference camera passing the depth test.

Wherein, the depth test in step 4: a vertical distance from a point P to an optical center of the reference camera is: a depth value of P under this camera is recorded as $Depth_1$, and a depth value of a pre-stored depth map of a reference camera at $Pixel_R$ is recorded as $Depth_2$, if $Depth_1 = Depth_2$, the reference camera passes the depth test of the point P.

Wherein, in step 5, after the depth test is completed, the four reference cameras are designated weights by a calculation formula of:

$$W_R = \frac{1}{1 - <\frac{\vec{L}}{|\vec{L}|}, \frac{\vec{L}_R}{|\vec{L}_R|}>};$$

wherein, $\vec{L}$ is defined as a vector pointing from the center of the sphere to the rendering camera; $\vec{L}_R$ is defined as a vector pointing from the center of the sphere to the reference camera; a value range of W is $[0.5, \infty)$; and after normalizing $W_R$, the pixel value of the rendering camera at $Pixel_D$ is $$Pixel_D = \Sigma_R W_R Pixel_R$$

wherein R is a set of reference cameras passing the depth test.

Wherein the related files in step 1 comprise a low-precision three-dimensional object model, external and internal parameters of the reference cameras, a same number of pictures, files describing a relative position relationship of the reference cameras, and setting files describing attributes of a data set thereof.

Wherein, a number of faces of the low-precision three-dimensional object model is 30,000 to 100,000.

Compared with the prior art, the present invention saves computing resources, users only need ordinary computing devices such as mobile phones or laptops to quickly and instantly see the rendering results. The users interact with the rendering engine through a sliding operation interface, so that the object can be viewed from any angle on the sphere, which is the so-called "all-around". The "all-around" effect provided by the present invention ensures that the users do not have to miss the angle they want to observe, and have better results in many fields. For example, when shopping online, users can see the whole picture of an object instead of a single picture from several angles. And because the rendering results are completely taken from real picture data (image set), their authenticity has also been enhanced, and users can feel a more realistic immersion.

These and other objectives of the present invention will no doubt become obvious to those of ordinary skill in the art after reading the following detailed description of the preferred embodiment that is illustrated in the various figures and drawings.

DETAILED DESCRIPTION

The present invention will be further described with reference to the drawings.

Referring to FIG. 1a to FIG. 4, FIG. 1a to FIG. 4 show an embodiment of the present invention. This embodiment implements a light field rendering engine using a non-traditional method, which can not only realize real-time rendering, but also render images of real objects from various perspectives by using multi-viewpoint images. Specific implementation steps are as follows:

FIG. 1a to FIG. 1d are input format pictures of data registration format of this embodiment. The input data of this embodiment includes: a low-precision three-dimensional object model (30,000 to 100,000 faces), 200 to 300 external and internal parameters of the reference cameras, a same number of pictures, files describing a relative position relationship of the reference cameras, and setting files describing attributes of a data set thereof. Please refer to the diagrams for specific information.

Figure 1A:
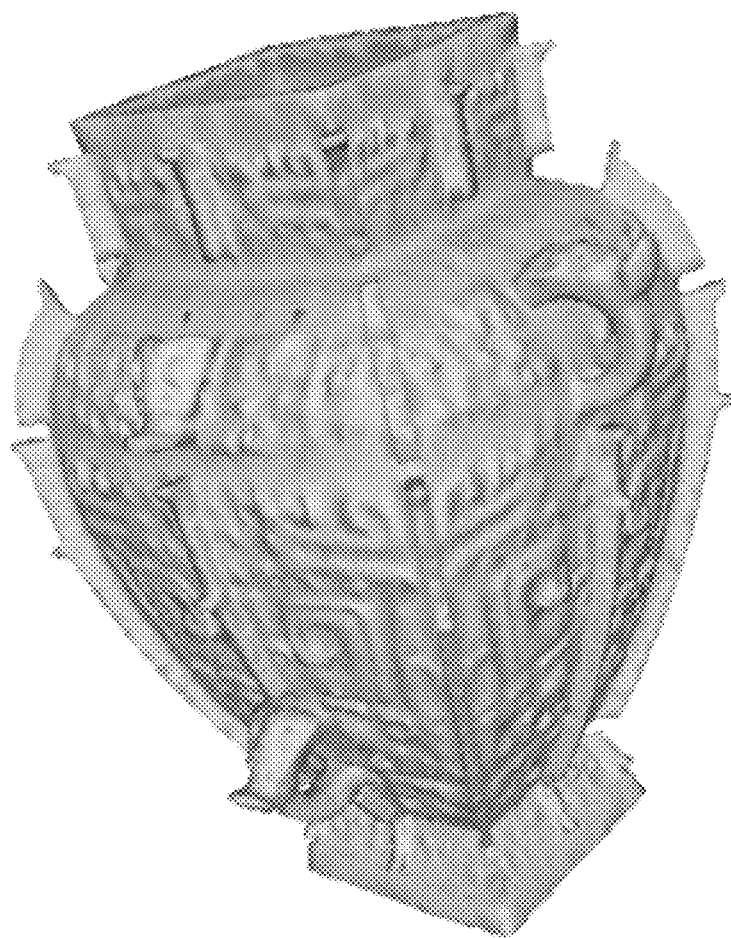
FIG. 1a is a schematic diagram of an input format picture.
Figure 1B:
FIG. 1b, FIG. 1c, and FIG. 1d are schematic diagrams of input pictures, respectively.
Figure 1C:
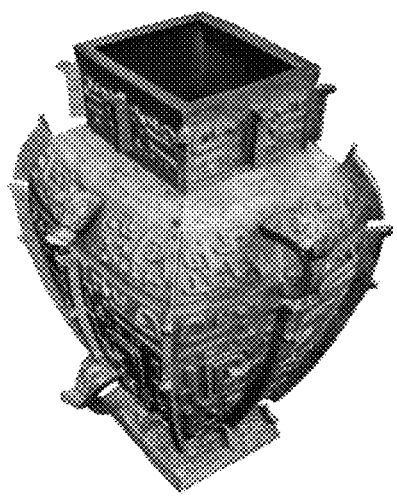
Figure 1D:
Figure 3:
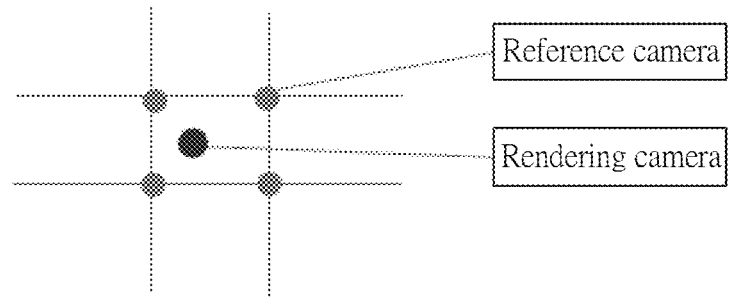
FIG. 3 is a schematic diagram of the relative position of the rendering camera and the reference cameras.

Referring to FIG. 3, the reference cameras narrated below are the cameras that capture input pictures. The rendering camera is a camera interactively determined by a user, and is used to render output pictures. Parameters of the cameras may be the same or different. FIG. 1a is a three-dimensional model of an object, which contains a total of 30,000 vertices and 140,000 faces. FIG. 1b to FIG. 1d are three examples of image sets, which are pictures of the object taken from three different angles. The above image sets also include similar pictures taken from other angles.

The following table describes external parameters of a reference camera, which is divided into 4 lines; each line contains 3 values, and each line represents Z-axis vector, X-axis vector, Y-axis vector and coordinates of the camera; other reference cameras have their own corresponding values.

| Z axis: | −0.332360 | −0.107990 | −0.936950 |
| X axis: | −0.309017 | 0.951057 | 0.000000 |
| Y axis: | 0.891092 | 0.289533 | −0.349464 |
| Coordinates: | 8.973725 | 2.915740 | 31.297643 |

The following table describes an internal parameter matrix of a reference camera, including optical center coordinates and focal length data of the camera; other reference cameras have their own corresponding values.

| 1236.07 | 0.00 | 512.00 |
| 0.00 | 1236.07 | 512.00 |
| 0.00 | 0.00 | 1.00 |

Figure 1E:
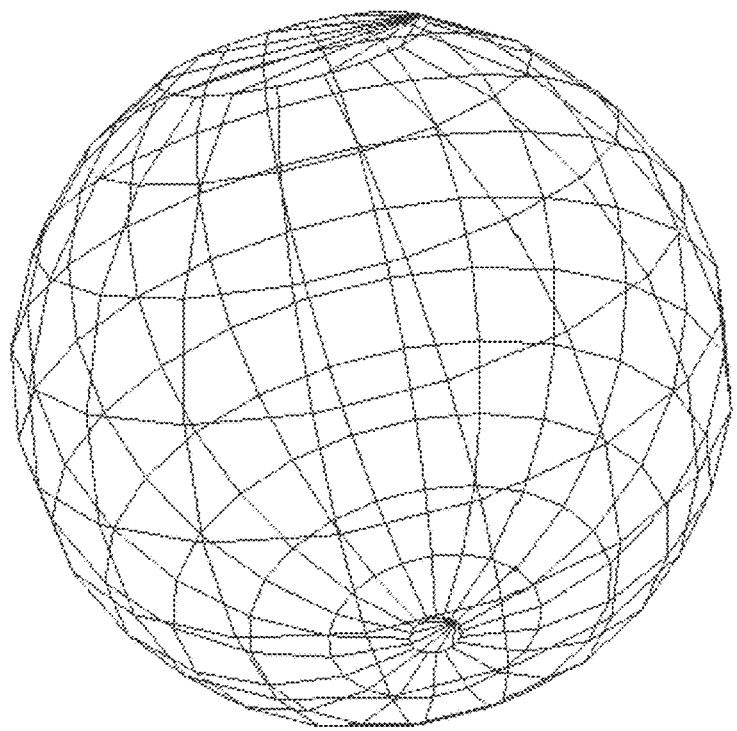
FIG. 1e is a schematic diagram of the reference cameras distributed on a sphere in a grid shape in an embodiment of the present invention.

FIG. 1e is a schematic diagram of the position of visualized reference cameras. The reference cameras are fixedly and uniformly arranged on a sphere.

The following table describes additional attributes of the input data. Meanings of items from top to bottom in the table are a number of high-resolution pictures, a number of low-resolution pictures, a high horizontal resolution, a high vertical resolution, a low horizontal resolution, a low vertical resolution, a center coordinate of the reference cameras, a radius of the sphere where the reference cameras are located, a near plane of the reference cameras, and a far plane of the reference cameras.

N_REF_CAMERAS_HIGH: 220
N_REF_CAMERAS_LOW: 0
width_H: 1024
height_H: 1024
width_L: 256
height_L: 256
camera_center: 0 0 6
camera_radius: 27
near: 0.1
far: 50.0

Figure 2:
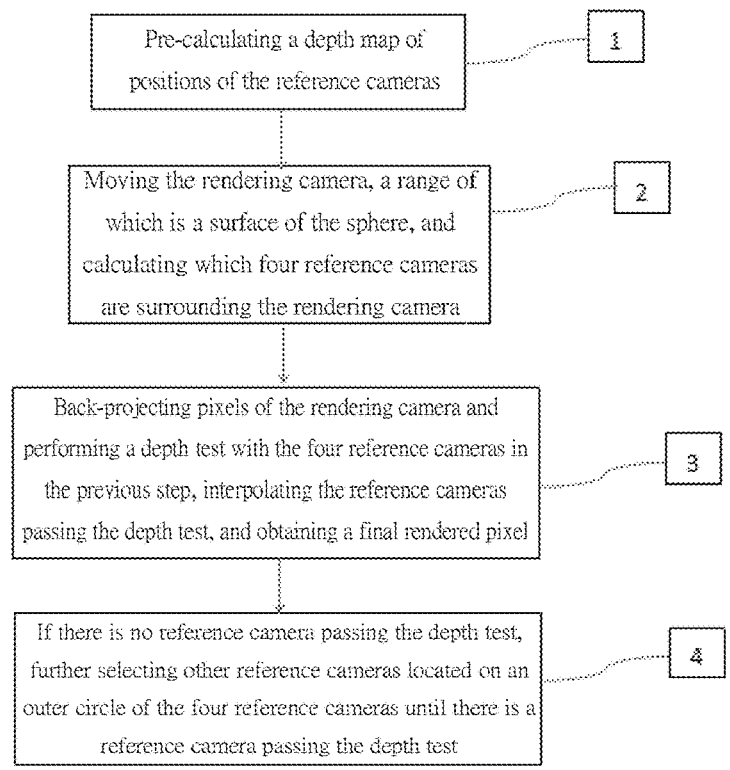
FIG. 2 is an explanatory diagram of a rendering process of the present invention.

Referring to FIG. 2, which is a flowchart of a rendering method provided by the embodiment. The rendering method mainly includes the following steps:

Step 1: pre-calculating a depth map of positions of the reference cameras.

Step 2: moving the rendering camera, a range of which is a surface of the sphere, and calculating which four reference cameras are surrounding the rendering camera.

Step 3: back-projecting pixels of the rendering camera and performing a depth test with the four reference cameras in the previous step, interpolating the reference cameras passing the depth test, and obtaining a final rendered pixel value.

In the above process, in the data reading stage, the embodiment needs to calculate a depth map of the position of each reference camera in advance for subsequent depth testing.

The rendering camera determines the angles from which the users can observe the object, which determines the rendered output images. Referring to FIG. 1e, the sphere where the reference cameras are located determines a range of movement of the rendering camera. In this embodiment, when the position of the rendering camera is fixed, numbers of the four reference cameras around the rendering camera need to be calculated, as shown in FIG. 3. Because the numbers of the reference cameras may be shuffled, the input data need to include the position relationship of the reference cameras, as shown in FIG. 1e, and then the vector-quadrilateral intersection algorithm is used.

First, the embodiment calculates the vector $\vec{L}$, with a starting point at the center of the reference cameras, and an ending point at the coordinate of the rendering camera. Because the reference camera sphere may be considered as consisting of multiple quadrilaterals, the vector-quadrilateral intersection algorithm may be used to detect which quadrilateral intersects the vector $\vec{L}$. Then, the embodiment checks the input camera position file to get the numbers of the four candidate reference cameras.

Figure 4:
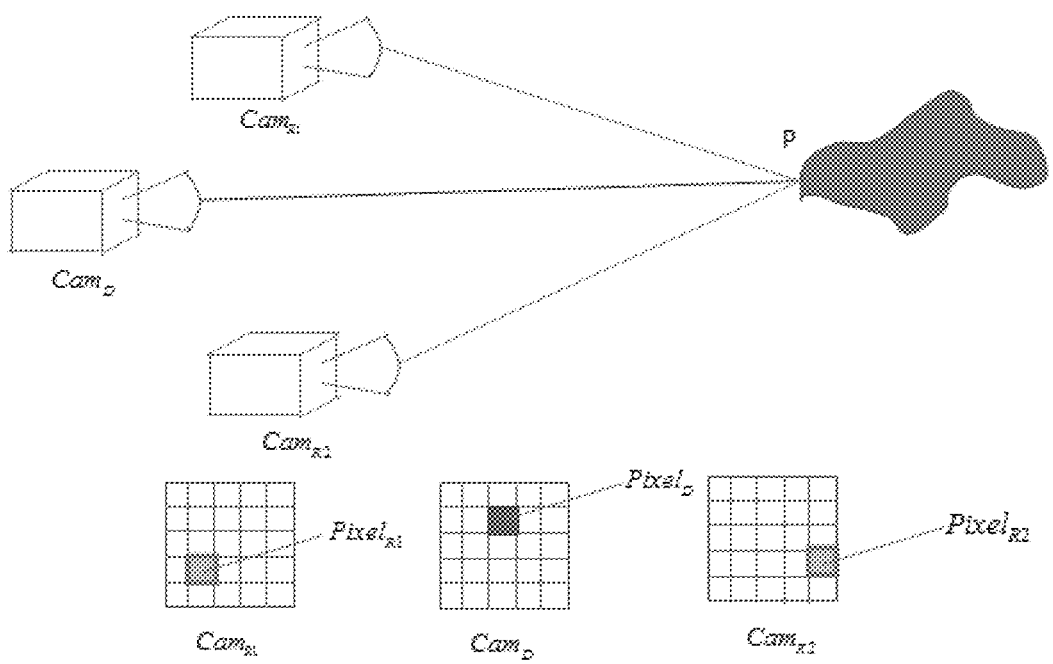
FIG. 4 is an explanatory reference diagram of projection and back-projection.

Referring to FIG. 4, in step 3, each pixel $Pixel_D$ of the rendering camera $Cam_D$ is back-projected to a point P on the surface of an object. Then, the point P is projected to the four reference cameras (only two are shown in FIG. 4, the other two are the same), and separately pixels $Pixel_{R1}$, $Pixel_{R2}$, $Pixel_{R3}$, $Pixel_{R4}$ are obtained. At this time, the possible situation is that in a view of the reference camera, the point P is blocked by rest of the object and is not visible. Therefore, a depth test needs to be performed before interpolation.

Then, the embodiment performs the depth test: a vertical distance from the point P to the light center of the reference camera $Cam_{R1}$ is a depth value of the point P under this camera, which is recorded as $Depth_1$, and simultaneously a depth value of a pre-stored depth map of the reference camera $Cam_{R1}$ at $Pixel_{R1}$ is recorded as $Depth_2$; if $Depth_1=Depth_2$, the reference camera $Cam_{R1}$ passes the depth test of the point P. Similarly, the depth tests on $Cam_{R2}$, $Cam_{R3}$, and $Cam_{R4}$ may be performed respectively.

The four reference cameras are designated weights by a calculation formula of:

$$W_R = \frac{1}{1 - <\frac{\vec{L}}{|\vec{L}|}, \frac{\vec{L}_R}{|\vec{L}_R|}>}$$

wherein, $\vec{L}$ is defined as a vector pointing from the center of the sphere to the rendering camera; $\vec{L}_R$ is defined as a vector pointing from the center of the sphere to the reference camera $Cam_R$; a value range of W is $[0.5,\infty)$. For reference cameras that fail the depth test, the weights are assigned to 0. For reference cameras that pass the depth test, the weights are uniformly normalized after calculation.

If the number of cameras that pass the depth test is not 0, then the pixel value of the rendering camera at $Pixel_D$ is $Pixel_D=\Sigma_R W_R Pixel_R$ wherein R is a set of reference cameras passing the depth test.

If there is no reference camera passing the depth test, then other reference cameras located on an outer circle of the four reference cameras are selected until there is a reference camera passing the depth test. Specifically, if none of the four reference cameras has passed the depth test, the cameras around the four reference cameras are continuously expanded, and the step 4 is repeated in a rectangle made of twelve reference cameras on the outside; that is, the back-projection and the depth tests are performed. At this time, it may be guaranteed that more than 99% of the pixel values can pass the depth tests, and then the end of the rendering may be considered.

In the embodiment of the present invention, software may be used in a smart phone or a computer to provide a user with interactive means to move the rendering camera. The present invention requires less computing resources and achieves real-time rendering results in the above-mentioned device by combining specific input data.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An all-around spherical light field rendering method, characterized by comprising the following steps:
   step 1: a preparing step, for preparing input and load of related files;
   step 2: pre-calculating a depth map of positions of a plurality of reference cameras densely distributed on a sphere in a grid shape;
   step 3: moving a rendering camera, a range of which is a surface of the sphere, and calculating and identifying four reference cameras of the plurality of reference cameras surrounding the rendering camera;
   step 4: back-projecting pixels of the rendering camera and performing a depth test with the four reference cameras;
   step 5: interpolating a set of reference cameras of the plurality of reference cameras passing the depth test, and obtaining a final rendered pixel value.

2. The all-around spherical light field rendering method according to claim 1, characterized by if there is no reference camera passing the depth test in step 4, further selecting other reference cameras of the plurality of reference cameras located on an outer circle of the four reference cameras until there is a reference camera of the plurality of reference cameras passing the depth test.

3. The all-around spherical light field rendering method according to claim 1, characterized in that the depth test in step 4: a vertical distance from a point P to an optical center of a reference camera of the four reference cameras is: a depth value of P under this camera is recorded as $Depth_1$, and a depth value of a pre-stored depth map of a reference camera at $Pixel_R$ is recorded as $Depth_2$, if $Depth_1=Depth_2$, the reference camera of the four reference cameras passes the depth test of the point P.

4. The all-around spherical light field rendering method according to claim 1, characterized in that in step 5, after the depth test is completed, the four reference cameras are designated weights by a calculation formula of:

$$W_R = \frac{1}{1 - <\frac{\vec{L}}{|\vec{L}|}, \frac{\vec{L}_R}{|\vec{L}_R|}>};$$

wherein, $\vec{L}$ is defined as a vector pointing from the center of the sphere to the rendering camera; $\vec{L}_R$ is defined as a vector pointing from the center of the sphere to a reference camera of the four reference cameras; a value range of $W_R$ is $[0.5,\infty)$; and the pixel value of the rendering camera at $Pixel_D$ is $Pixel_D=\Sigma W_R Pixel_R$ wherein R is the set of reference cameras of the plurality of reference cameras passing the depth test.

5. The all-around spherical light field rendering method according to claim 1, characterized in that the related files in step 1 comprise a low-precision three-dimensional object model, external and internal parameters of the of the plurality of reference cameras, a same number of pictures, files describing a relative position relationship of the of the plurality of reference cameras, and setting files describing attributes of a data set thereof.

6. The all-around spherical light field rendering method according to claim 5, characterized in that a number of faces of the low-precision three-dimensional object model is 30,000 to 100,000.

* * * * *